Figure 5:
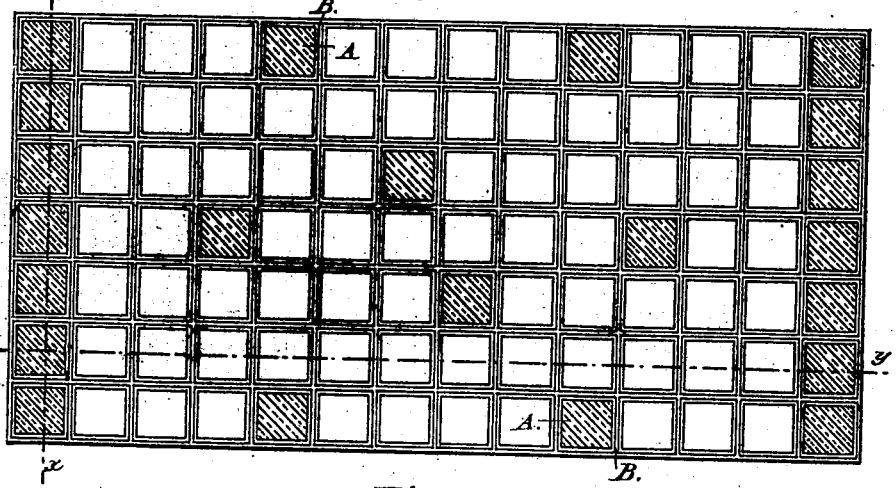

6 Sheets—Sheet 1.
T. HYATT.
Application of Cements, Clays, Metals and Glass in Forming Illuminated or other Gratings, Vault-Covers, Roofs, &c.
No. 206,332. Patented July 23, 1878.
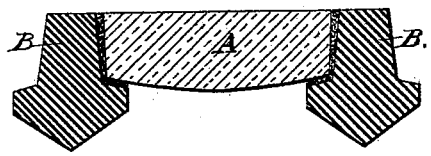
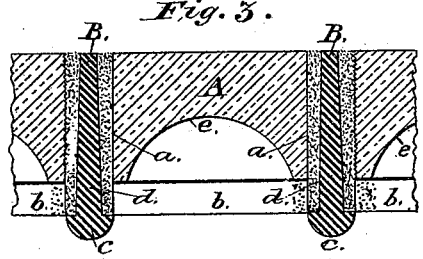
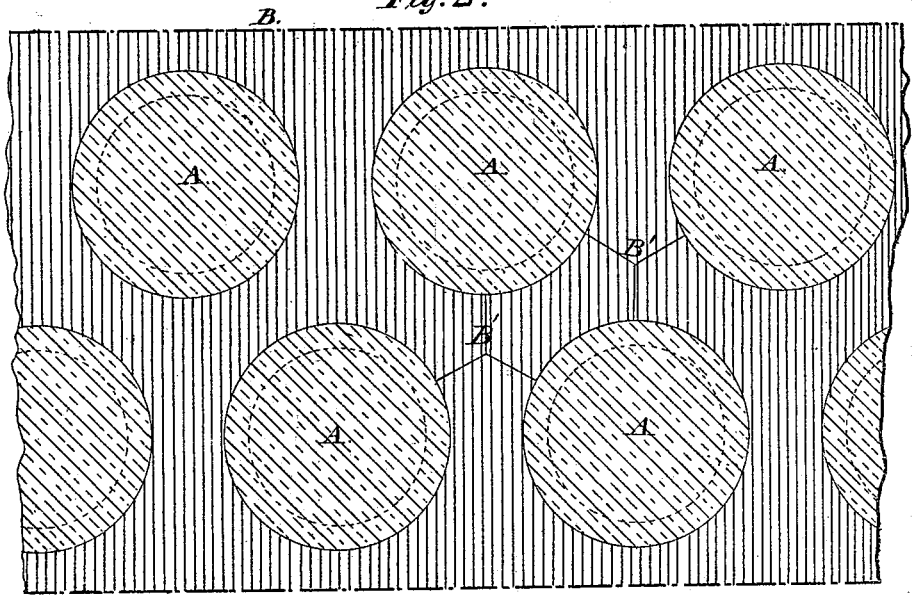
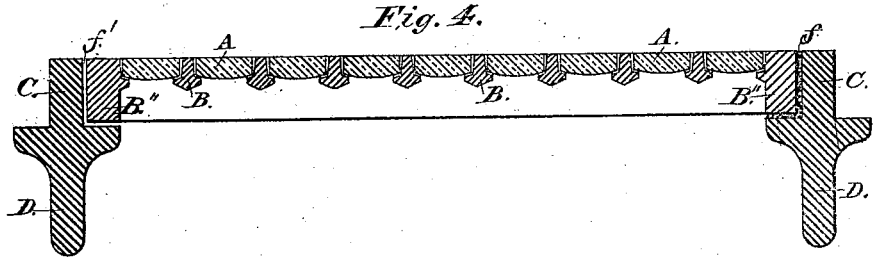
Witnesses:
T. C. Brecht
A. Moore
Inventor:
Madden & Co.

T. HYATT.
Application of Cements, Clays, Metals and Glass in Forming Illuminated or other Gratings, Vault-Covers, Roofs, &c.

No. 206,332. Patented July 23, 1878.

WITNESSES
T. C. Brecht
A. Moore

INVENTOR
Thaddeus Hyatt

T. HYATT.
Application of Cements, Clays, Metals and Glass in Forming Illuminated or other Gratings, Vault-Covers, Roofs, &c.
No. 206,332. Patented July 23, 1878.
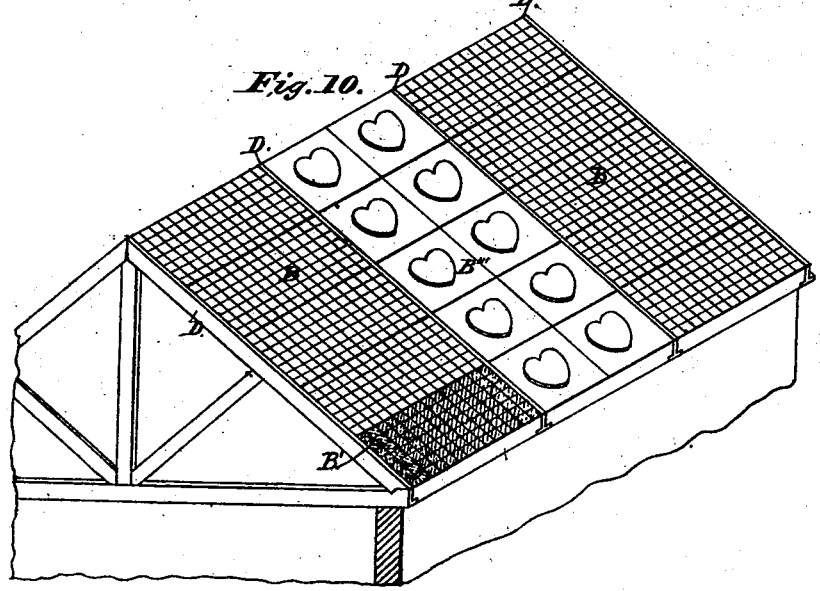
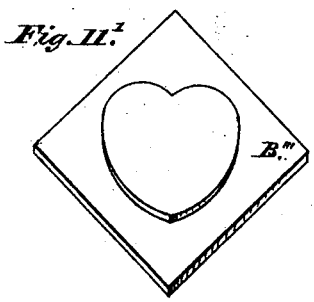
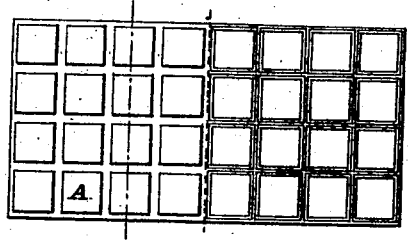
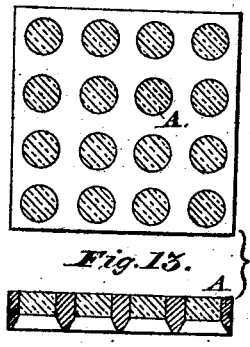
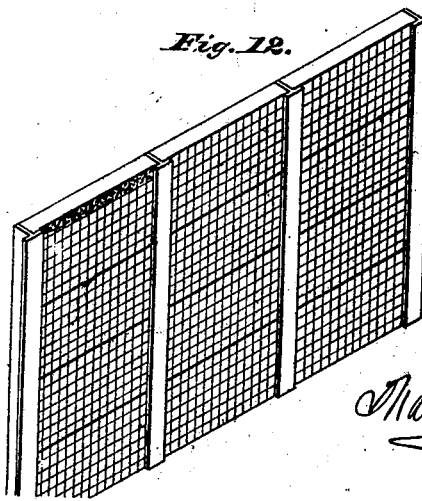
WITNESSES
INVENTOR 6 Sheets—Sheet 4.
T. HYATT.
Application of Cements, Clays, Metals and Glass in Forming Illuminated or other Gratings, Vault-Covers, Roofs, &c.
No. 206,332. Patented July 23, 1878.
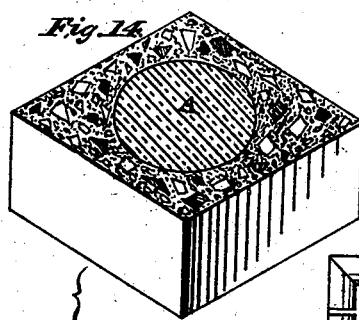
Fig. 14.
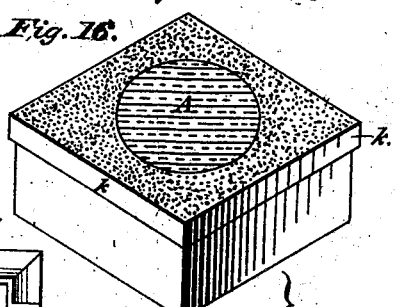
Fig. 16.
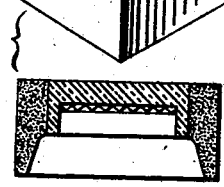
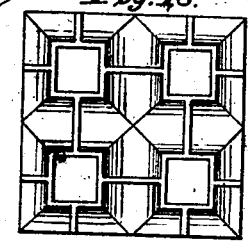
Fig. 78.
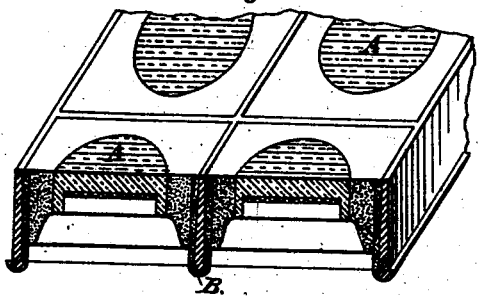
Fig. 15.
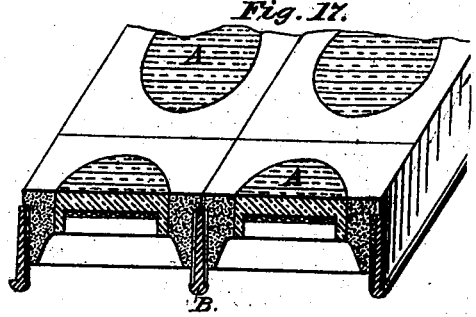
Fig. 17.
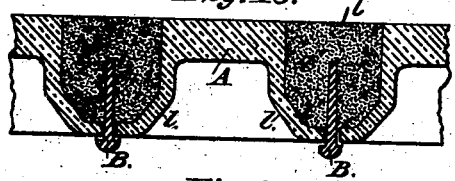
Fig. 18.
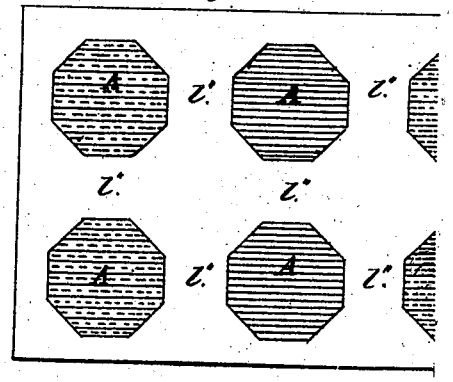
Fig. 19.
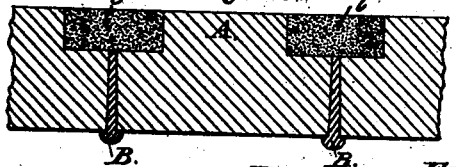
Fig. 20.
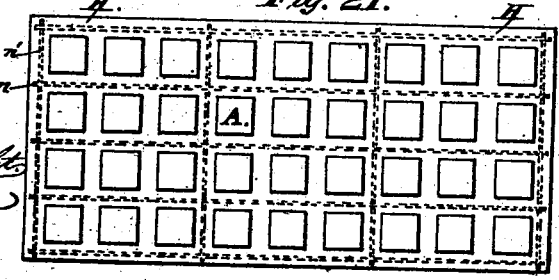
Fig. 21.
WITNESSES
INVENTOR T. HYATT.
Application of Cements, Clays, Metals and Glass in
Forming Illuminated or other Gratings,
Vault-Covers, Roofs, &c.
No. 206,332. Patented July 23, 1878.
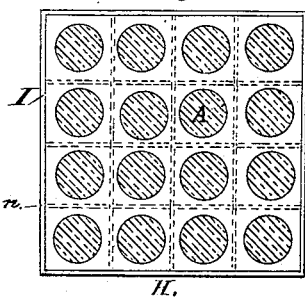
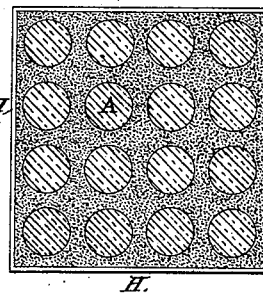
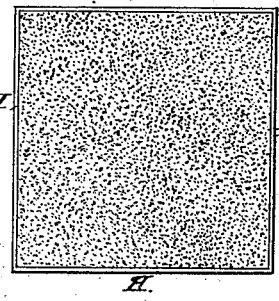
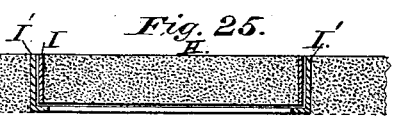
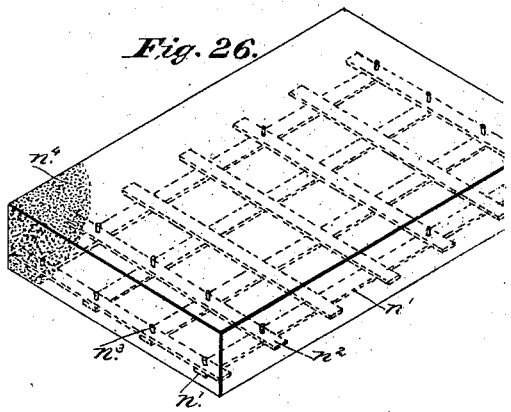
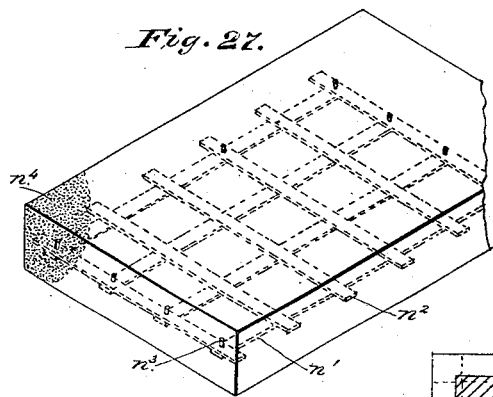
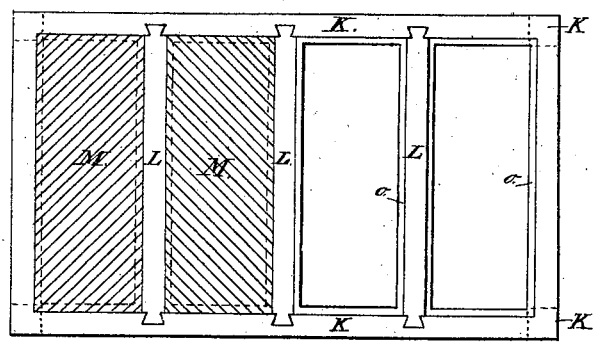
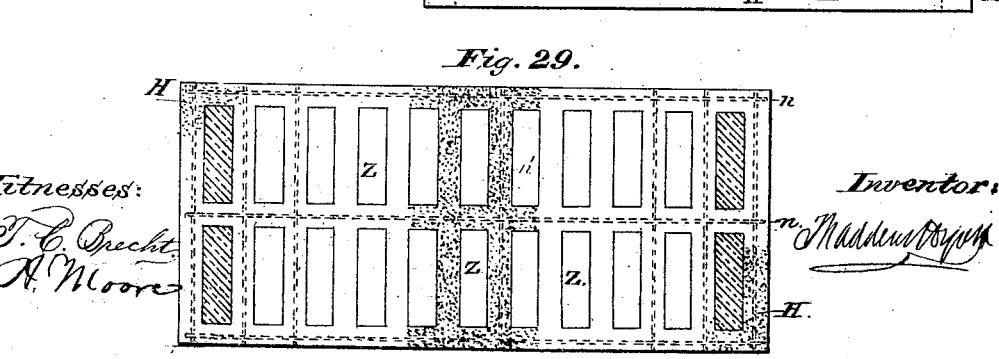
Witnesses:                                  Inventor:

T. HYATT.
Application of Cements, Clays, Metals and Glass in Forming Illuminated or other Gratings, Vault-Covers, Roofs, &c.

No. 206,332. Patented July 23, 1878.

Witnesses:
T. C. Brecht
A. Moore

Inventor:
Thaddeus Hyatt

UNITED STATES PATENT OFFICE.

THADDEUS HYATT, OF NEW YORK, N. Y., ASSIGNOR TO ELIZABETH A. L. HYATT, FOR HERSELF AND AS TRUSTEE FOR BESSIE L. HYATT, THADDEUS P. HYATT, CLOTILDE S. HYATT, JAMES H. L. HYATT, AND ANNIE F. HYATT.

IMPROVEMENT IN THE APPLICATION OF CEMENTS, CLAYS, METALS, AND GLASS IN FORMING ILLUMINATED OR OTHER GRATINGS, VAULT-COVERS, ROOFS, &c.

Specification forming part of Letters Patent No. 206,332, dated July 23, 1878; application filed July 15, 1878.

*To all whom it may concern:*

Be it known that I, THADDEUS HYATT, of 25 Waverley Place, in the city, county, and State of New York, have invented certain new and useful improvements in the use and application of hydraulic (including Sorel or magnesian) cements and concretes, baked clays, and papier-maché, in combination with metal, and in combination with glass, and combinations of the two, as a building material, and in building constructions made therefrom, and in means, modes, and processes connected therewith, the same in part being applicable to pavements and other walking-surfaces, of which improvements and combinations the following is a specification.

My invention relates to hydraulic (including magnesian) cements, and concretes made therefrom, including substances of the nature of papier-maché or fibrous concretes, applied to building purposes, with reference, primarily, to the construction of surfaces designed to produce illumination, ventilation, ornamentation, security against fire, burglars, condensed moisture, and to make safe walking-surfaces.

*Illumination.*—The "Hyatt light," or illuminating-gratings, known to the country for the last thirty years and more, and invented by me, have been always distinguished for their massiveness and strength, but have been open to objection on three grounds: first, amount of light disproportioned to surface; second, liability to leakage at the borders of the gratings, where joined to the frames; and, third, condensation of moisture; and these three faults all proceed from one and the same source—viz., an improper distribution of the metal. The gratings, as described in the original patent, were in the nature of a perforated plate. Now, the difference in principle between the disposition of metal in plate form and metal in beam form will be apparent without illustration to every engineering mind. My present improvement disposes the metal of the grating in beam form. Thus disposed, my new illuminating-gratings become virtually a congeries or assemblage of web and flange beams or blades, exposing but little radiating-surface to produce condensed moisture, and for the same reason intercepting but a minimum of the light-rays, the metal also, from its blade or beam form, becoming as distinguished for rigidity as the plate form is for flexibility—a result of this quality of the metal being security against leakage at the joints or bearings, and a capacity for being fastened at those points without bolts or rivets, and to be made water-tight by the one means employed for fastening the gratings to their seats. The plate gratings but rarely exceed seventy inches of glass to the one hundred and forty-four of surface, and more frequently at the present time contain not more than forty inches, whereas my improved or beam gratings have a capacity, when required, of one hundred and ten inches of glass to the one hundred and forty-four inches of surface. The obvious objection to the metal in this form, where the gratings are exposed to concussion, arises from the danger of sudden rupture where the material is ordinary cast-iron. A part of my invention, therefore, consists in making them of cast-steel, malleable iron, and wrought-iron. For distinctiveness, I call this new style of grating the "spider-web grating."

In order to render apparent the difference between the plate grating and the beam or spider-web grating, I represent by Figure 1 a cross-section of the former, where A is a bull's-eye glass, resting in a seat in the iron, which intercepts some twenty per cent. of its vertical light. B represents the metal bars of the grating.

Fig. 2 shows a plan view of the plate and the mass of metal at the angles B', where three glasses meet.

Fig. 3 represents the beam or spider-web grating, in which, it will be observed, all the vertical rays of light that fall upon the glass pass through it without interception, the cement which confines the glass to its position being hydraulic, and which, as employed, is also my invention, the glass being held securely by mere surface or side adhesion, the glasses for this purpose being made deepest at the sides *a a*, and which also constitutes a part of my invention. $b\ b$ represent a belt of exposed hydraulic cement just below the glass. It forms a part of the packing around the glass, between it and the blade $d\ d$ of the grating, and rests upon the top of $c\ c$, which is the bottom flange of the blade $d$. This belt of cement, $b$, acts as an absorbent to drink up any condensed moisture formed upon the under face of the glass A, the under face, $c\ c$, of the glass being curved to compel the moisture to pass down to the absorbent $b$. These means and combinations to effect this purpose form also a part of my invention.

Fig. 4 represents an improved grating of the old construction, for the purpose of giving rigidity to the plate, the improvement consisting in the rim $B''$, formed around the edges of the grating, upon its under face, to increase the general stiffness of the plate, and at the same time produce a vertical seam or packing-joint of sufficient depth to contain the hydraulic cement, the same both fastening the grating to its seat without the use of bolts and producing a water-tight joint. This improvement also constitutes a part of my invention. C C represent a portion of the frame usually employed to connect the grating-panels into extended surfaces, as area-coverings and otherwise. $f\ f'$ represent the improved vertical seam—$f'$ a seam without packing, and $f$ a seam filled with hydraulic cement.

By my new method of beam-construction gratings the bearing-edges are sufficiently deep to produce the results hereinabove set forth.

*Sectional illuminating-gratings.*—The patent-light business of the country has been always hampered for want of some reliable and certain mode of constructing the gratings in stock sizes. For want of this orders can never be executed until after measurements of the openings to be covered have been taken, and "patent lights" as yet have failed to become merchandise in the markets of the world.

Illuminating-grating surfaces, as at present made, are obtained by means of a foundation-frame made with panel-openings filled with gratings, one grating to each panel-space, the width of the frame corresponding to the width of the area covered by it, the length of the panel-spaces consequently being equal or nearly equal to the width of the area, and, as observed, one grating-panel to each panel-space. My improvement deals with these grating-panels, for, instead of making a grating as large as the panel-space, I make a series of sectional panel-gratings to fill each space, the sections, when put together, having the appearance of a single casting of large size; and in order to meet the requirements of all sorts and sizes of areas to be covered and other openings, I establish a set of standard sizes of the sectional gratings as to lengths and widths, by the combination of which panel-spaces of every dimension may be filled from stock sizes, the manufacture of these sectional gratings in stock sizes constituting a part of my invention.

Figure 6:
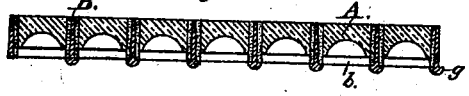
Figure 7:

Figs. 5, 6, and 7 represent, in plan and cross-section, (Fig. 6 being a section at $x\ x$, and Fig. 7 at $y\ y$,) a sectional grating two feet in length and one foot in width, one and a half inch thick, the diameter of the light-holes, as a rule, equalling their depth.

Figure 8:
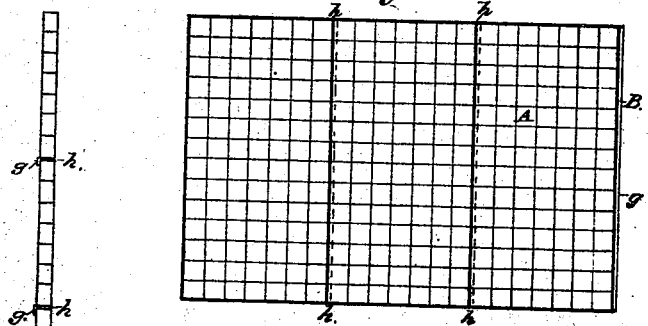

Figs. 8 and 8' represent three sectional gratings as to the mode of joining them, the lip or ledge $g\ g$ upon the side of one section underlapping the edge of the abutting grating, the vertical seam $h\ h$ between the two being then secured by hydraulic cement grouting.

The foundation-frame above mentioned is costly to make and to handle, being very heavy.

Figure 9:
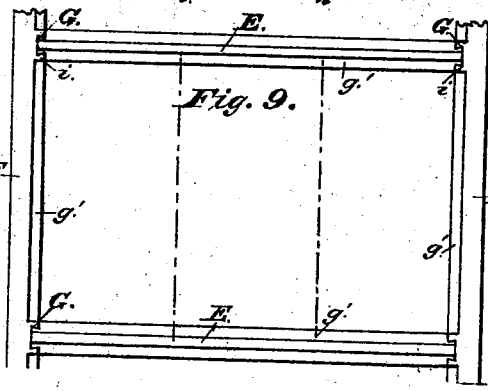

Fig. 9 represents my improved sectional frame or foundation. F F are front and rear pieces or risers, cast with sockets or shoes G. E E are the bearing-bars to make panel-spaces. Each bar is cast with an enlarged or wedge-shaped head, $i\ i$, to drop into the shoes or sockets G, and are there made fast by hydraulic cement. This method of constructing illuminating walking and weather surfaces is equally applicable to non-illuminating surfaces, such surfaces being easily made by merely substituting opaque blocks for the glass blocks. By the use of blocks of baked clay, or those made of hydraulic cement or equivalent weather-proof and durable material, colored, glazed, or otherwise, I produce weather and walking surfaces substantially as above described, except as to light.

*Roof and weather surfaces.*—The weather-surface of roofs, as ordinarily made, is a mere veneer of light material overlying a roof-framing underneath it. By my improved method of construction the frame of the entire roof is made in the form of a grating, by combining sectional gratings, as hereinabove described, and in the manner described, with the roof-rafters, and then blocking the apertures of the grating, in manner as aforesaid.

Fig. 10 represents a roof thus constructed; B B, the spider-web gratings, abutting with each other, and forming one of the ranges or panels between the rafters D D. A portion of the gratings are represented open, as at B B, and a portion closed, as at B' B'. A part of my invention consists in covering these gratings with a construction made to produce the effect of ornamental roofing-tiles, the invention consisting in making ornamental baked-clay or other tiles, to overlie the surface of gratings, and at the same time to be firmly interlocked within the meshes of the grating. This purpose I accomplish by forming the tiles upon the back or under face with blocks to fit the openings in the gratings, as represented by Fig. 11, $11^1$, $11^2$, $B'''$ being the face of the tile, and A A the blocks upon the under or grating face. These tiles may be molded from hydraulic cement, especially the Sorel, or made of Portland, and faced with the Sorel in plain or fancy colors, and with bas-relief figures upon them, as shown, or made with a weather-face to resemble overlapping tiles, or otherwise formed.

The tiles may be molded upon the gratings, or made separately and attached to them in manner as represented. The construction may also be such as to conceal the rafters, the tiles overlying them. These tiles may also be made of baked clay; and the hereinabove-described manner of constructing roofs constitutes a part of my invention.

Fig. 12 represents substantially the same construction applied to walls where the light iron T-posts do the work of the roof-rafters, the spaces between them being closed substantially in the manner already described with respect to roofs. A number of these T-posts being established at convenient distances apart upon the foundation of the house, concrete beams are laid upon them and a concrete floor supported upon such beams. The bays or spaces between the piers or posts will be light or dark, according as the gratings forming the weather-surface are blocked with glass or with opaque material.

Another part of my invention consists in applying the spider-web gratings as movable portions of weather and walking surfaces. Thus far I have represented them as fixtures, being very much lighter than the ordinary cast-iron gratings, and tougher, and hence not easily broken. They make excellent flap-doors for roofs and walking-surfaces, and I apply them for these purposes by the usual mechanical adaptations, which it is not necessary to here illustrate, the matter being readily comprehended by any one skilled in the art of building. Where light is not required in these and the aforementioned constructions, I sometimes, for the sake of lightness, close the gratings with papier-maché. In other cases, where glasses are employed, I coat the framework or grating of metal with papier-maché, setting the glasses directly in the same.

Another part of my invention consists in setting the spider-web gratings with thick plates of polished glass, to render the same transparent as well as translucent in forming permanent or fixed as well as movable weather-surfaces, such as windows, the same being, to a degree, burglar-proof as well as fire-proof.

*Stone or cement gratings.*—Another part of my invention consists in combinations of glass with hydraulic cements, particularly the magnesian, molded either directly upon the glasses or molded separately in the form of stone gratings or perforated stone plates. These stone gratings may be made of sizes small or large, according to the strength of the materials employed, magnesian cement being stronger than Portland.

Fig. 13 represents a stone grating ten inches in diameter and one inch and a half thick, the apertures being closed by glass. A part of this invention consists in forming the light holes with splayed or flaring under faces to spread the light, the glasses being designedly placed at considerable distances from one another, for the purpose of producing an ornamental or safe walking foot-surface at top. Another part of this part of my invention consists in molding the aforesaid stone lights or stone gratings in colors, and combining the same by means of a foundation-grating of metal to form weather and walking surfaces, each stone grating or stone mount being cemented to the metal grating the same as glasses are secured in the seats or apertures thereof.

Fig. 14 represents a single glass set in a cement mount, and Fig. 15 represents a grating set with such mounted glasses.

By these two modes of combination—viz., glasses in clusters, as in Fig. 13, and single glasses, as in Fig. 14—and their combination with metallic gratings, concrete or artificial-stone safe-walking illuminating-surfaces of any size and to any extent may be made; and by forming these mounts and stone gratings in colors, or with colored wearing-faces, and in geometrical or design shapes, like Minton pavement-tiles, and combining them with each other, I make walking and weather and other surfaces of great utility and beauty, a part of my invention consisting in making the aforesaid stone gratings and mounts of Portland or equivalent hydraulic cement, combined with a wearing-surface of the Sorel or magnesian cement, the Portland cement or concrete being first tamped around the glass or glasses in the mold to the required depth, and then the Sorel being put upon it and well tamped down, the two cements adhering perfectly and making a perfect bond.

As one variety of manufacture, I make the aforesaid stone gratings and mounts with a party-colored or variegated face by peculiar means, which means also forms a part of my invention.

Ordinary scagliola is made from materials not well adapted to bear exposure to the weather, and particularly not adapted for being walked upon.

Now, my invention consists in making a new kind of scagliola, capable of withstanding weather and wear, and useful for all the purposes to which the common material and similar imitations of variegated marbles are applied, (a special patent for which and its applications I propose hereafter to apply for.) This new material I make as follows: I first make cakes or tablets of hydraulic cements in colors, making use of the magnesian, specially and principally because of its pure white character, as a base for mixing with suitable pigments, or with pulverized and suitably-prepared colored marbles and other stones and materials. Having in this way formed my design colors, on the cakes becoming sufficiently hard and friable, I proceed to reduce them to fragments of irregular shapes and of various dimensions. These fragments I now employ, in combination with hydraulic cement as a binder, to form the new scagliola, working, forming, casting, and molding the same into all the shapes and figures required, and afterward polishing or not, as required. With this material I make stone gratings and mounts similar to those represented by Figs. 13 and 14, (Fig. 14 showing a variegated face, as described,) and the illuminating concrete gratings represented by Fig. 15, the hydraulic scagliola being employed either for making the entire body of stone or merely as a facing. These hydraulic scagliola stone lights may, when so required, be ground and polished upon the face of the grating.

Fig. 15 represents a concrete light so formed as that the metal bars which form the strength of the grating—in fact, the grating—are made to combine with the stone as a part of the general walking and wearing surface. The object of this method of construction is to make a concrete light for hard usage, to be laid at places and subjected to the traffic of heavy merchandise, and the concussion of boxes and packages liable to be thrown down upon it, the metal net-work at the surface of the construction giving durability and strength to the face of the work. This mode of construction also forms a part of my invention.

Figs. 16 and 17 illustrate a method of construction of greater beauty than the preceding, but less capable of withstanding hard usage. This style of work is more adapted for vestibules and halls, and places where mere foot-traffic will pass over it. The mount 16 is formed with an enlarged upper section, $k$, or head, so that when set in the metal grating the metal bars will not be seen, as shown by Fig. 17. I sometimes cast these mounts around the glasses within the cells of the grating by means of a mold-board or bed placed under the grating, made with supports to hold the glasses in position and produce the flaring or splayed openings aforementioned, this process forming a part of my invention.

I have already stated the purpose of making the apertures or light-holes of concrete gratings flaring—viz., because of the spaces between the glasses at the surface, made necessary to secure the requisite area of concrete safe-walking foot-surface—and I have shown one mode of effecting this object; but the same construction, substantially, may be made in either of two other ways—one by the formation of the under side of each glass as represented by Fig. 18, which is such a glass, and the other by the formation of the iron grating as shown by Fig. 18', which represents a piece of such a grating composed of a congeries of pyramidal shells united at their bases, and strengthened by cross-blades between on the upper or hollow side, the glasses surmounting the pyramidal openings, and the concrete filling occupying the spaces between, as shown.

Fig. 18 represents a glass made with a flaring base, $l$ indicating the polished under face, and $l'$ the upper side of the same, to form a lodgment or rest for the concrete $l''$. This glass, as may be seen by reference to Fig. 19, is an octagon at the top; and the construction of glasses in geometrical and design forms for combination with and combining them with cements and concretes to form weather and walking surfaces forms part of my invention of improvements in concrete lights.

It will be seen by Fig. 19 that the effect of the geometrical form of the glass at the surface of the construction is to produce geometrical figures in the concrete filling between the glasses. This is an important matter, as it is an easy mode of obtaining ornamental surfaces of great beauty at comparatively slight cost, the glasses themselves becoming the means of forming the inlaying channels at the surface necessary for the work of ornamentation. The channels, on being filled with the concrete $l''$, particularly if more than one color be employed, give to the face of the grating the appearance of colored inlays of baked clay in the form of tiles, slips, and dots.

Where light in the weather and walking surfaces is not required, or required only partially, my invention consists in producing substantially the constructions aforesaid, by employing, as a substitute for the glasses, colored or other ornamental blocks made from baked clays, or from colored hydraulic cements or concretes, setting the same in the gratings as described with respect to the glasses, and shaping and combining the same with colored cements, concretes, or tiles, slips, and dots of baked clay, to form ornamental walking and weather surfaces, as aforesaid, a part of my invention consisting in making illuminating, walking, and weather surfaces by combining baked-clay tiles, slips, and dots with the glasses of illuminating-gratings, a further part of my invention consisting in making and using for the aforesaid purposes glasses molded and shaped geometrically to correspond to the stock sizes of the encaustic and colored tiles, slips, and dots existing in the markets.

A further part of my invention consists in making baked-clay gratings and mounts after the manner I have hereinabove described with respect to hydraulic cements and concretes, and combining glasses with the same, for the uses and purposes as aforesaid.

Fig. 20 represents an ornamental cement or concrete slab, made, as represented, with tie-metal strength, or without, according to circumstances, the invention consisting in molding the body of the slab of concrete, so as to leave or form the projecting pieces or blocks A, which in effect correspond to the glasses A, heretofore described as to these blocks by their position with reference to one another, and by their shape and contour serving to determine the form of the channels between them, and the general surface design produced by filling or inlaying the channels with colored cements or baked clays.

Another part of my invention consists in making hydraulic-cement and concrete constructions substantially the same as the foregoing, and designed for the same purposes as to illumination, ornamentation, safe walking, and fireproofing; but in place of employing molded and cast-metal gratings as the core or tie-metal portion of the structures, I adopt the cheaper method of extemporizing the metal cores from hoop-iron threaded upon wires or thin blades of metal placed edgewise and halved together, or hoop-iron studded with pins or stops, and laid flatwise in the concrete to serve as tie-metal.

Fig. 21 represents a concrete illuminating-slab six feet long, fourteen inches wide, and two and one-fourth inches thick. The glasses A, which are two and one-fourth inches square, are set at three and one-half inches from center. The tensional strength of the slab, and also, in part, its compressile strength, is due to five blades of metal, $n$, each one and one-fourth deep by three-sixteenths thick, threaded upon wires $n'$, three and one-half inches apart, as represented by the drawing. The slab which this draws represents supported thirty hundred-weight, or six hundred pounds to the square foot, superficial, with a deflection of but one inch, and regained its level on the removal of the load, the concrete not being cracked nor a glass broken. The value of illuminating-constructions of this character as a building material for sustaining loads, withstanding burglars, and resisting fire may hence be inferred.

Another part of my invention consists in a new construction of illuminating and non-illuminating coal-hole plates and coal-hole slabs to receive the plates or vault-covers, the invention being represented by Figs. 22, 23, 24, and 25, the invention as to the vault-covers H, Figs. 22, 23, 24, consisting in making them of concrete within an encircling and protecting metal band, I, to prevent the edges of the coal-hole plate from becoming broken or spalled in the frequent removals to which such covers are subject in use; and the invention as to the coal-hole slab consists in protecting the mouth of the hole with a belt or lining, I', of iron, to protect it from injury, and to also at the same time furnish a seat or rabbet for the cover H to rest in.

Fig. 22 represents a cover formed with tie-metals $n$ and set with glasses A; Fig. 23, the same with no metals; and Fig. 24, a concrete cover with a metal-protected rim.

Another part of my invention, and which relates to the construction of slabs for the flagging of sidewalks and other public thoroughfares, is represented by Fig. 26; and consists in the employment of a double set of flat ties, as shown, one set, $n'$, lying in one direction across the slab, and the other set, $n''$, lying at right angles thereto, the pins or stops $n'''$ running through the two layers of metal at the angles where they cross each other. The object of this construction is to produce the strongest slabs of least thickness, and to make them of equal cross strength upon all sides.

Figs. 27 and 27' represent a slab of similar construction, but of double thickness. The purpose of this construction is to make a slab equally strong however laid, whether upon one face or the other, the ties being placed midway between the two faces, as shown.

Another part of my invention relates to the method of forming walking-surfaces or pavements, as to laying the flags or slabs. Ordinarily they are laid directly upon the earth, the consequence of which is a wealth of unevenness and an unlimited amount of discomfort to pedestrians.

My invention, to secure a permanently even and level foot-pavement at moderate cost, consists in laying the slabs upon beams or bearers, the same being made permanently level by resting the bearing ends upon suitable piers or dwarf-walls established upon foundations laid below the frost. Fig. 28 represents this part of my invention. K represents the main beams; L, cross-beams interlocked with the main beams by the enlarged heads. The dotted lines K' represent the piers on which the main beams rest. $o$ represents rabbets in the beams, to form a seat for receiving the slabs.

Another part of my invention relates to an entirely new and very novel application of hydraulic cements combined with metal.

The power of the magnesian or Sorel cement as a matrix has been well set forth in "Gillmore on Artificial Stone"—as small an amount as five per cent. of the cement having in some cases proved sufficient to make hard stone with its aggregates. A still more valuable feature of this species of hydraulic cement is its ability to combine with aggregates in the condition of dust or powder, whereas dust impoverishes Portland cement.

My invention, taking advantage of these qualities of the Sorel cement, utilizes them for making open-work constructions, such as guards, gratings, railings, and the like, and some solid constructions, such as newels, handrails, window sashes and frames, and other surfaces, it being possible, by this method of construction, to produce work equaling in beauty carved marbles in white and variegated colors. A part of my invention consists in applying this method of construction to furniture-manufacture and objects of art, the same to be made the subject of another patent.

A part of my invention consists in the employment of the Sorel cement as a facing upon Portland or equivalent hydraulic cement.

Fig. 29 represents a concrete open grating, designed as a walking-surface for durability and safety. In this construction the blades of metal, $n$, are threaded upon the wires $n'$, and then incased within the concrete H, Z being the apertures or open spaces for ventilation or otherwise. These gratings I propose to make of Portland cement, magnesian, or a combination of both, as already mentioned.

Fig. 29 may serve to illustrate the mode of making such open gratings of concrete, to be employed in the various forms of treads, risers, steps, platforms, stoops, sills, and plates, for general building purposes, as naked iron is now employed—the grating 29 here illustrated, and its applications, as aforesaid, all forming a part of the subject-matter of my invention.

Figure 30:
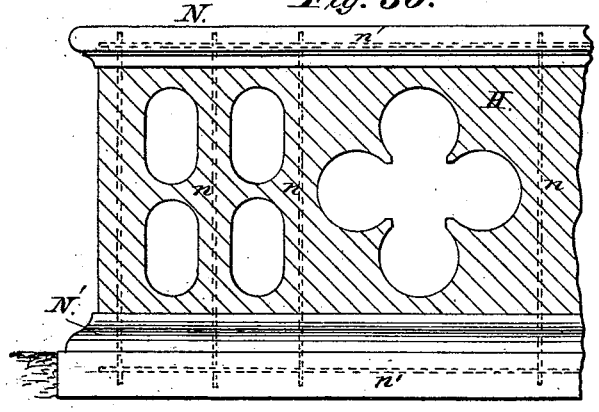

Fig. 30 represents a concrete railing or guard N. N' represents a coping or foundation for making a finish or base, and as a convenient means of attaching it to the ground.

The above figures, 29 and 30, are given as examples of constructions that may be cheaply formed, light metals and but little or no riveting being required, the hydraulic grouting cementing the various parts of the loose irons together, and the body or incasement of cement producing coherency and solidity in the finished article.

When laid upon the earth in slab form, the Sorel cement, contrary to what would have been expected of it, has been found to rot, whereas Portland-cement slabs laid upon the earth or under water increase in strength and durability with time; but Portland cement exposed to the air becomes absorbent if not treated preventively, and is liable to decay from frosts. The magnesian cement, on the other hand, resists frosts and atmospheric changes. Acting upon a knowledge of these facts, a part of my invention consists in combining the two cements, using the Sorel as the weather-face, and the Portland as the under surface or concrete body, in this way making a perfect artificial stone.

Figure 31:
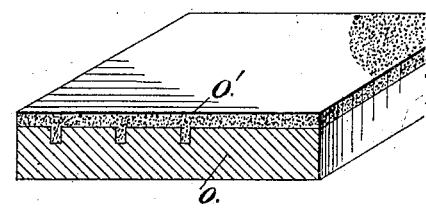

Fig. 31 represents a slab thus constructed, O being the Portland, and O' the magnesian, cement.

As a precautionary measure, I prefer to mold the Portland with channels, as shown, to allow the magnesian to enter them, and thus give greater holding-power to the face upon its bed.

Figure 32:
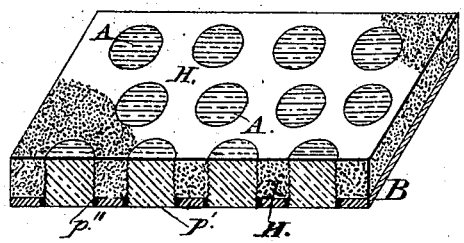

Fig. 32 represents a stone grating, H, containing the glasses A, and attached to a metal foundation-plate, B, the method of attachment being as follows, viz: The lower portions of the glasses $p'$ enter the apertures of the metal plate, and are therein secured by means of hydraulic cement $p''$. The glasses thus fixed to the metal plate become fixed points or blocks for holding the concrete to the metal, especially when the glasses are formed with roughened or serrated sides, as shown in Fig. 32.

Figure 33:
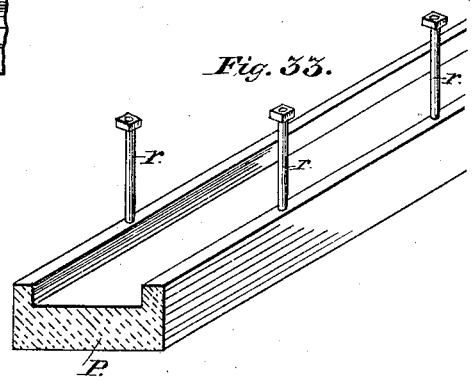
Figure 34:
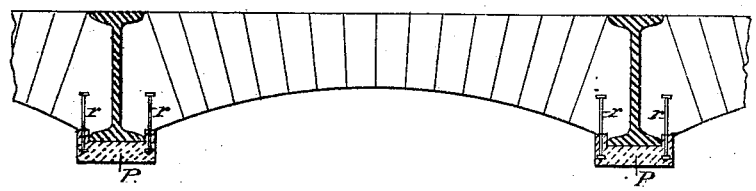

*Fire-proof floors and ceilings.*—The object of this part of my invention is to furnish an inexpensive but sure and perfect protection against fire to the iron beams used in building-constructions, particularly to the lower flanges thereof, as represented by Fig. 33, where P represents a flange-protector made wide enough to inclose the under face of the flange. These protectors are made of incombustible materials, such as my improved Portland cement made fire-resisting by means of sulphur; or of soap-stone, preferably of the artificial kind, made by combining powdered soap-stone with Sorel cement; or of fire-brick, asbestus, or other fire-resisting materials, the same being formed with tie-metals and furnished with vertical holding-pins, as seen at $r$, Fig. 34, which run up and take into the body of the concrete or brick arch, as shown.

Figure 35:
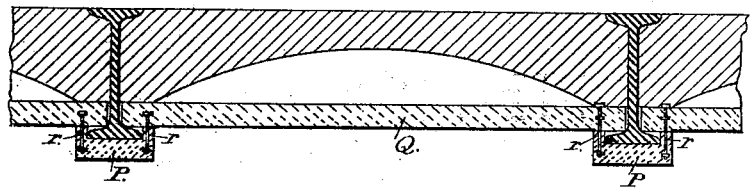

Fig. 35 represents a fire-proof ceiling formed by the flat slab Q, which is made of fire-proof concrete upon tie-metals and laid upon the bottom flanges of the beams, as represented. The holding-bolts of the flange-protectors run up into and through this slab, as represented, and are confined by nuts applied to the upper sides, as shown.

The webs and top flanges of the beams may now be incased with fire-proof concrete, and a wood floor formed above them upon wood supports laid on the bays between the beams; or a concrete or brick arch, as represented, may be formed upon centers placed upon the ceiling-slabs and left within the construction.

My invention consists in this method of constructing the fire-proof ceilings and attaching the flange-protectors under the beam-flanges, substantially as shown, and in making such flange-protectors substantially as described, and in convenient length for handling.

Having thus fully described and illustrated my invention, what I claim, and desire to secure by Letters Patent, is—

1. Generally, the manufactures as herein described and illustrated, and the modes, means, and processes connected therewith, when the same are employed for the purposes and in the manner substantially as herein set forth, and illustrated by my drawings.

2. Spider-web or beam gratings, as a new manufacture, with reference to preventing condensed moisture and increasing the light-area of illuminating-gratings, and as a means of making weather and walking surfaces, substantially in the manner and for the purposes as herein described and illustrated.

3. Curving the under faces of the glasses of illuminating-gratings, when the same are combined with a layer or band of absorbent material at the base of the glasses to receive and drink up the condensed moisture, substantially as herein set forth.

4. Setting the glasses of illuminating-gratings by means of side adhesion, in connection with an enlarged area of the side surface of such glasses, and in some cases also with serrated or roughened side surfaces, with reference to increasing the percentage of illuminating-surface in such gratings, substantially as herein set forth.

5. Spider-web or beam gratings made of cast-steel or malleable iron, and from hoop-iron or steel blades, as a new manufacture, and combining the same, as a core or skeleton, with glass or other materials, for illumination or ornamentation, substantially as herein set forth.

6. Illuminating-gratings of combined metal, glass, and papier-maché, substantially as herein set forth.

7. Illuminating-gratings, including mounts of baked clay, artificial stone, and papier-maché, combined with glass, substantially as herein set forth.

8. Strengthening hydraulic-cement or artificial-stone and papier-maché gratings by means of tie-metals, or of a metallic core or skeleton, substantially as herein set forth.

9. Facing illuminating-gratings, including mounts, with a walking and weather surface of magnesian or Sorel cement, substantially as herein set forth.

10. Artificial-stone gratings made of magnesian cement, substantially as herein set forth.

11. Ornamental illuminating-surfaces formed by combinations of colored mounts or colored baked-clay or artificial-stone gratings set with glass, said mounts and gratings being either made wholly of colored material or faced with colors, substantially as herein set forth.

12. Ornamental illuminating-surfaces formed by combinations of colored "tiles," "slips," and "dots," with glasses shaped to match the same, substantially as herein set forth.

13. Tiles, slips, and dots made of hydraulic cements and concretes, and combining the same with glass to form illuminating-surfaces, substantially as herein set forth.

14. Geometrical glasses of shapes and sizes to match the "stock sizes" of the baked-clay tiles, slips, and dots on the market, substantially as herein set forth.

15. Combining the glasses of illuminating-gratings with colored hydraulic cements and concretes, to form ornamental illuminating-gratings.

16. Combining the glasses of illuminating-gratings with hydraulic cements and concretes of different colors, to form particolored and design surfaces, substantially as herein set forth.

17. Combining the glasses of illuminating-gratings with hydraulic cements and concretes made parti-colored or "mosaic" by means of fragments of irregular shape, obtained by breaking or crushing pieces of pottery, colored ware, tiles of baked clay, or hardened cakes made of magnesian or other hydraulic cements, substantially as herein set forth.

18. Illuminating-gratings with design-surfaces in cement, colored or otherwise, produced by means of glasses of such contour and so placed with reference to each other as to develop the design required, the design-heads of the glasses standing above the level of the metal plate containing them, and thus forming channels to receive the cement or inlays, substantially as herein set forth.

19. Illuminating-gratings formed with flaring or splayed light-holes, produced by either the under face of the glass being molded in splayed form, or by casting the grating in the form of a shell of pyramidal openings, or by molding the under surface of the mounts or stone gratings with flaring light-holes, substantially as herein set forth.

20. Artificial-stone or concrete lights made by first molding and hardening the concrete in suitable form to be applied, and then applying the same as a mount or stone grating to the metal foundation, and securing the same to the meshes of the grating, or to the face of the metal plate, by the agency of hydraulic cement, substantially as herein set forth.

21. The mode herein described of securing illuminating-grating panels to the bed-frame without drilling or bolting, vertical seams being formed at the bearing-lines, of such depth as to enable the cement packing to likewise hold the panels to their seats by side adhesion, substantially as herein set forth.

22. The mode of constructing the bed-frame of illuminating-gratings in detached parts, and putting the same together by means of interlocking heads and grouting, and combining illuminating-gratings with such foundations, to construct walking and illuminating surfaces, substantially as herein set forth.

23. Sectional panel-gratings as a new manufacture, substantially as herein set forth.

24. Illuminating and ornamental roofs and weather-surfaces, substantially as herein set forth.

25. Illuminating, ornamental, and safe walking-surfaces, substantially as herein set forth.

26. Transparent burglar and fire proof weather or window surfaces and constructions, substantially as herein set forth.

27. Illuminating and ornamental hydraulic scagliola weather and walking surfaces, substantially as herein set forth.

28. Concrete lights formed with protecting-lines or net-work of metal, the same forming a portion of the walking-surface, and at the same time forming, of preference, the metallic strength of the grating, substantially as herein set forth.

29. Concrete slabs formed with flat tie-metals in the nature of a wattling, or cross-ties, for giving tensional strength to the slab in all directions, substantially as herein set forth.

30. Method of laying flag-stones upon a beam foundation, with under spaces to avoid effects of frost, substantially as herein set forth.

31. Concrete coal-hole plates and coal-hole slabs, protected against spalling by means of an encircling band of metal around the edge of the coal-hole plate, and around the mouth of the coal-hole, substantially as herein set forth.

32. Composite hydraulic slabs of concrete, made by combining a Portland-cement base with a magnesian wearing and weather surface, substantially as herein set forth.

33. Open-work or ventilating concrete and hydraulic-cement constructions, to serve as railings, gratings, guards, &c., substantially as herein set forth.

34. Beam-flange protectors, and the means of fastening the same by bolts extending up into the arches or through the ceiling, substantially as herein set forth.

35. Fire-proof ceiling and floor construction by combination of ceiling-slab, flange-protectors, and floor-surface with iron beams, substantially as herein set forth.

THADDEUS HYATT.

Witnesses:
 A. MOORE,
 H. E. BATES.